United States Patent
Komaki et al.

(10) Patent No.: US 6,977,770 B2
(45) Date of Patent: Dec. 20, 2005

(54) OPTICAL AMPLIFIER AND CONTROL METHOD THEREFOR

(75) Inventors: Kosuke Komaki, Kawasaki (JP); Hiroyuki Itou, Sapporo (JP); Hiroshi Iizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 355 days.

(21) Appl. No.: 10/316,080

(22) Filed: Dec. 11, 2002

(65) Prior Publication Data

US 2003/0231379 A1 Dec. 18, 2003

(30) Foreign Application Priority Data

Jun. 14, 2002 (JP) ...................................... 2002-173620

(51) Int. Cl.[7] .............................................. H01S 3/00
(52) U.S. Cl. ............................. 359/337.11; 359/341.41
(58) Field of Search ...................... 359/337.1, 337.11, 359/341.41, 341.42, 337.4

(56) References Cited

U.S. PATENT DOCUMENTS

| | | | |
|---|---|---|---|
| 5,805,322 A | 9/1998 | Tomofuji | 359/177 |
| 5,889,609 A | 3/1999 | Fukushima | 359/280 |
| 5,966,327 A | 10/1999 | Sugaya et al. | 359/341 |
| 6,055,092 A | 4/2000 | Sugaya et al. | 359/337 |
| 6,061,171 A * | 5/2000 | Taylor et al. | 359/337.1 |
| 6,369,938 B1 | 4/2002 | Sugaya et al. | 359/341.42 |
| 6,411,430 B1 * | 6/2002 | Ogino et al. | 359/337.11 |
| 6,421,169 B1 * | 7/2002 | Bonnedal et al. | 359/337.1 |
| 6,560,008 B1 * | 5/2003 | Wada | 359/337 |
| 6,603,596 B2 | 8/2003 | Inagaki et al. | 359/341.4 |
| 6,687,045 B2 * | 2/2004 | Lelic | 359/337.1 |
| 2001/0017729 A1 | 8/2001 | Sugaya et al. | 359/341.41 |
| 2002/0044343 A1 * | 4/2002 | Manzur | 359/337.11 |
| 2003/0035203 A1 * | 2/2003 | Shlifer et al. | 359/337.1 |
| 2003/0231379 A1 * | 12/2003 | Komaki et al. | 359/337.4 |
| 2004/0027651 A1 * | 2/2004 | Balland et al. | 359/341.41 |
| 2004/0085625 A1 * | 5/2004 | Motoshima et al. | 359/341.41 |
| 2004/0100688 A1 * | 5/2004 | Iizuka et al. | 359/341.41 |
| 2004/0114215 A1 * | 6/2004 | Tian et al. | 359/341.41 |

OTHER PUBLICATIONS

H. Suzuki et al., "Dynamic Gain Control by Maximum Signal Power Channel in Optical Linear Repeaters for WDM Photonic Transport Networks", IEEE Photonics Technology Letters, IEE Inc, New York, U.S. vol. 10, No. 5, May 1, 1998, pp. 734–736.

Communication dated Sep. 18, 2003 including European Search Report, EP03013310.

* cited by examiner

*Primary Examiner*—Thomas H. Tarcza
*Assistant Examiner*—Deandra M. Hughes
(74) *Attorney, Agent, or Firm*—Staas & Halsey LLP

(57) ABSTRACT

The optical amplifier according to the present invention includes a first optical amplifying unit, a second optical amplifying unit, a variable optical attenuator optically connected between the first and second optical amplifying units and a first control unit for controlling the gains of the first and second optical amplifying units according to an input to the first optical amplifying unit and an output from the second optical amplifying unit, and a second control unit for controlling the attenuation of the variable optical attenuator according to an input to and an output from the first optical amplifying unit and an input to and an output from the second optical amplifying unit.

12 Claims, 4 Drawing Sheets

OPTICAL AMPLIFIER AND CONTROL METHOD THEREFOR

BACKGROUND OF THE INVENTION

1. Field of the Invention

The present invention relates to an optical amplifier and a control method therefor.

2. Description of the Related Art

In recent years, a manufacturing technique and using technique for a low-loss (e.g., 0.2 dB/km) silica optical fiber have been established, and an optical communication system using the optical fiber as a transmission line has been put to practical use. Further, to compensate for losses in the optical fiber and thereby allow long-haul transmission, the use of an optical amplifier for amplifying an optical signal or signal light has been put to practical use.

An optical amplifier known in the art includes an optical amplifying medium to which signal light to be amplified is supplied and means for pumping the optical amplifying medium so that the optical amplifying medium provides a gain band including the wavelength of the signal light.

For example, an erbium doped fiber amplifier (EDFA) has already been developed to amplify signal light in a 1.55 μm band where the loss in a silica fiber is low. The EDFA includes an erbium doped fiber (EDF) as the optical amplifying medium and a pumping source for supplying pump light having a predetermined wavelength to the EDF. By preliminarily setting the wavelength of the pump light within a 0.98 μm band or a 1.48 μm band, a gain band including a wavelength of 1.55 μm can be obtained.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. At a receiving end, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

By using an optical amplifier as a linear repeater, the number of parts in the repeater can be greatly reduced as compared with the case of using a conventional regenerative repeater, thereby ensuring reliability and allowing a substantial cost reduction.

In the case of incorporating an optical amplifier into an optical fiber transmission system adopting WDM, various types of control for the optical amplifier are required to meet the requirement that the wavelength characteristic of gain must be kept constant and to prevent the waveform degradation due to the nonlinear effects in an optical fiber transmission line.

For example, the wavelength characteristic of gain in an EDFA changes according to the gain determined by a pumping condition, so that AGC (automatic gain control) is performed by giving a constant gain to an input to obtain an output. In this case, the output changes with a change in the input under the constant gain.

In an optical amplifier, a higher signal output is desirable from the viewpoint of an S/N. However, it cannot be said that this is generally true, in consideration of the wavelength degradation due to the nonlinear effects in an optical fiber transmission line and the input dynamic range at a receiving end. That is, it is required to perform ALC (automatic level control) so that the output from the optical amplifier becomes constant in a predetermined range.

There has been proposed an optical amplifier including first and second optical amplifying units and a variable optical attenuator connected between the first and second optical amplifying units as an optimum configuration for performing both AGC and ALC. In this configuration, AGC is performed in each of the first and second optical amplifying units, and ALC is performed by the variable optical attenuator.

This configuration has been proposed for the following reasons. The first reason is that if the variable optical attenuator for ALC is arranged on the front stage, there is a disadvantage from the viewpoint of optimization of the NF (Noise Figure) in the optical amplifier as a whole. The second reason is that if the variable optical attenuator for ALC is arranged on the rear stage, it is necessary to obtain a higher signal output power in the optical amplifying unit for AGC just upstream of the variable optical attenuator, so as to meet the requirement that a given signal output power from the optical amplifier must be ensured as a whole, resulting in a disadvantage from the viewpoint of reduction in power consumption of a laser diode as a pumping source.

In the above configuration suitable for both AGC and ALC, it is necessary to independently perform AGC in each of the first and second optical amplifying units, causing a problem that the configuration of the optical amplifier becomes complicated.

Further, in the case of using this optical amplifier in a system adopting WDM, there arises another problem that when the number of WDM channels changes, the control of the variable optical attenuator for ALC is complicated. More specifically, in the case of performing ALC in amplifying WDM signal light, the control is performed so that the total output power from the variable optical attenuator becomes constant. Accordingly, when the number of wavelength channels of the WDM signal light changes during operation of the system, a target value for the control of the variable optical attenuator is changed.

This target value for the control of the variable optical attenuator is generally transmitted from a supervisory control device provided upstream of the variable optical attenuator, so that a troublesome supervisory operation is required in response to a change in number of wavelength channels in the system. While the attenuation of the variable optical attenuator is temporarily fixed in response to a change in number of wavelength channels, it is necessary to carry out such a operation that the target value is updated to a power target value according to the change in number of wavelength channels in the condition where an ALC loop is open, and the ALC loop is thereafter closed. Accordingly, there is a possibility that the attenuation of the variable optical attenuator may vary during this operation. Further, since AGC is continuously performed in each of the first and second optical amplifying units, there is a possibility that the output power per wavelength channel may vary in switching the control of the variable optical attenuator.

SUMMARY OF THE INVENTION

It is therefore an object of the present invention to provide an optical amplifier applicable to WDM and a control method therefor which can suppress a control error in performing AGC and ALC, can eliminate a complicated configuration, and can easily respond to a change in number of wavelength channels.

In accordance with an aspect of the present invention, there is provided an optical amplifier including first and second optical amplifying units; a variable optical attenuator optically connected between the first and second optical amplifying units; a first control unit for controlling the gains of the first and second optical amplifying units according to an input to the first optical amplifying unit and an output from the second optical amplifying unit; and a second control unit for controlling the attenuation of the variable optical attenuator according to an input to and an output from the first optical amplifying unit and an input to and an output from the second optical amplifying unit.

For example, the first control unit controls the gains of the first and second optical amplifying units so that the output power from the optical amplifier becomes constant; and the second control unit controls the attenuation of the variable optical attenuator so that the sum of the gains of the first and second optical amplifying units becomes constant.

With this configuration, ALC is not performed on the variable optical attenuator, but AGC circuits are suitably combined to substantially perform ALC in the optical amplifier as a whole, thereby achieving the object of the present invention.

In accordance with another aspect of the present invention, there is provided a control method for an optical amplifier including first and second optical amplifying units and a variable optical attenuator optically connected between the first and second optical amplifying units. This method includes the steps of controlling the gains of the first and second optical amplifying units according to an input to the first optical amplifying unit and an output from the second optical amplifying unit; and controlling the attenuation of the variable optical attenuator according to an input to and an output from the first optical amplifying unit and an input to and an output from the second optical amplifying unit.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

A preferred embodiment of the present invention will now be described in detail with reference to the attached drawings.

Figure 1:
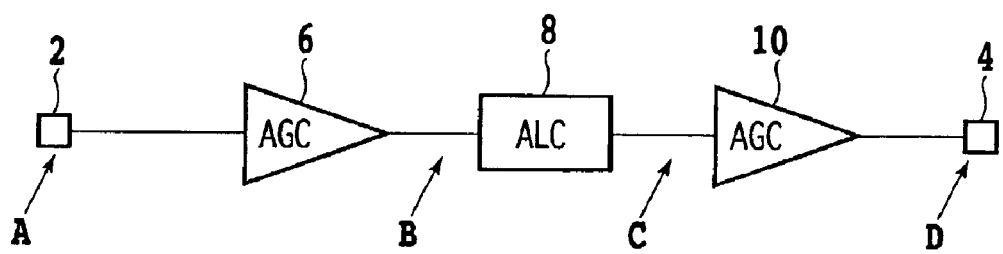
FIG. 1 is a block diagram showing a basic configuration of an optical amplifier to which AGC and ALC are applied.

FIG. 1 is a block diagram showing an optimum configuration for carrying out both AGC and ALC in an optical amplifier. An AGC unit 6, an ALC unit 8, and an AGC unit 10 are optically connected in this order between an input end 2 and an output end 4. For example, each of the AGC units 6 and 10 is provided by an EDFA, and the ALC unit 8 is provided by a variable optical attenuator.

In the AGC unit 6 arranged on the front stage, optical amplification by AGC including variations in power of input signal light is carried out. In the ALC unit 8, the power of output signal light is controlled to become constant, so that the control is performed so as to suppress variations in power of input signal light. Accordingly, in the case of power variations sufficiently slower than the time constant of the control in the ALC unit 8, the power variations of the input signal light can be completely suppressed in the ALC unit 8. Further, by setting the following value as a target control value, the power of signal light at the output end 4 can be indirectly controlled to a desired value in the ALC unit 8.

$$P_{ALC}[dBm]=P_{SIGOUT}-G_B$$

where $P_{SIGOUT}$ is the target value [dBm] of signal light at the output end 4, and $G_B$ is the set gain [dB] in the AGC unit 10 arranged on the rear stage.

In the AGC unit 10 arranged on the rear stage, the power of input signal light is constant because the power variations have been suppressed by the ALC unit 8. Accordingly, the power of output signal light also becomes constant according to the operation of the AGC unit 10, and the value of this constant power becomes equal to the target power at the output end 4.

Figure 2:
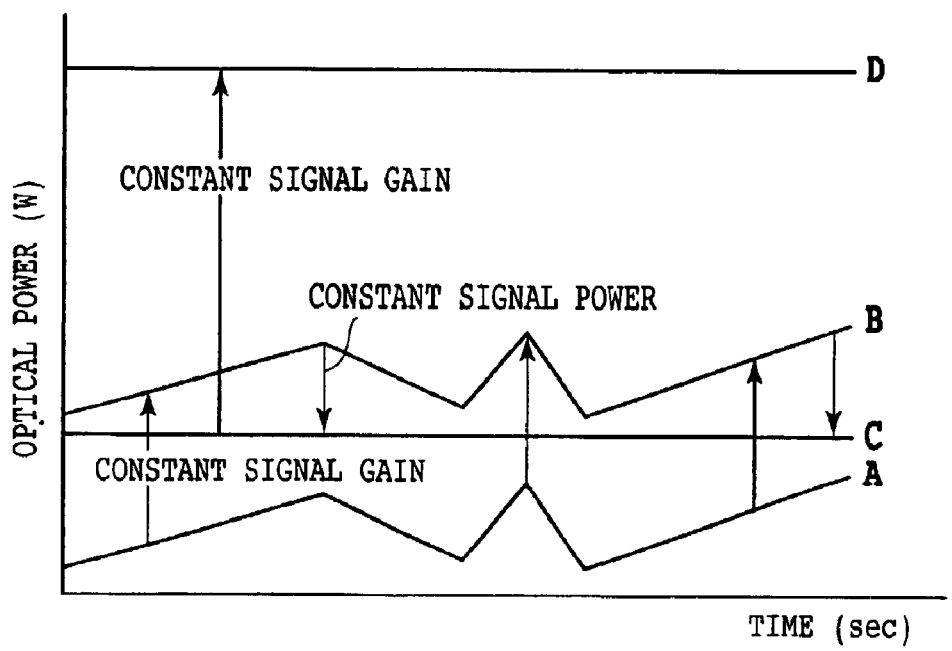
FIG. 2 is a graph for illustrating the operation of the optical amplifier shown in FIG. 1.

Referring to FIG. 2, there is schematically shown the operation in the configuration shown in FIG. 1. In FIG. 2, A denotes changes in signal light power at the input end 2, B denotes changes in signal light power at the input of the ALC unit 8, C denotes changes in signal light power at the input of the AGC unit 10, and D denotes changes in signal light power at the output end 4. An output from the AGC unit 6 reflects changes in signal light power at the input end 2, and changes in the output from the AGC unit 6 are suppressed according to the operation of the ALC unit 8. Then, the signal light power whose changes have been suppressed is amplified with a constant gain by the AGC unit 10.

In the configuration shown in FIG. 1, the ALC unit 8 is independently provided and there is therefore a problem that a change in number of WDM channels cannot be easily supported as described above. According to the present invention, this problem can be solved by suitably combining AGC circuits to thereby substantially obtain a function of ALC.

Figure 3:
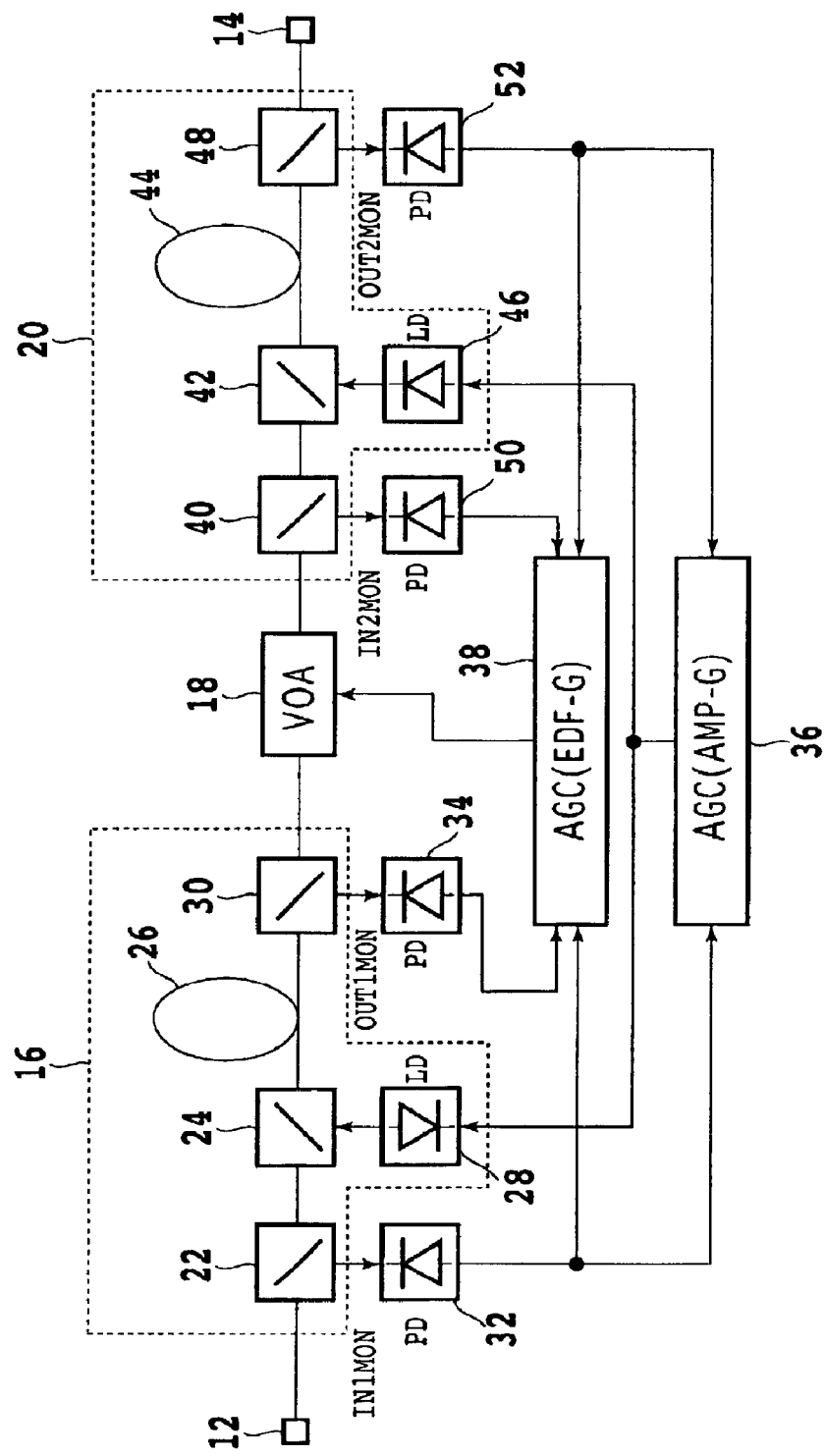
FIG. 3 is a block diagram showing a preferred embodiment of the optical amplifier according to the present invention.

FIG. 3 is a block diagram showing a preferred embodiment of the optical amplifier according to the present invention. This optical amplifier is configured by optically cascading a first optical amplifying unit 16, a variable optical attenuator (VOA) 18, and a second optical amplifying unit 20 between an input end 12 and an output end 14.

Signal light supplied to the input end 12 and to be amplified by the first optical amplifying unit 16 is supplied through an optical coupler 22 and a WDM coupler 24 in this order to an EDF (erbium doped fiber) 26. Pump light from a laser diode (LD) 28 is supplied through the WDM coupler 24 to the EDF 26, thereby obtaining a gain according to the power of the pump light. The signal light amplified in the EDF 26 is passed through an optical coupler 30 and then output from the first optical amplifying unit 16.

A photodetector (PD) 32 is provided to monitor the input to the first optical amplifying unit 16, and a photodetector 34 is provided to monitor the output from the first optical amplifying unit 16. The photodetector 32 converts the signal light split by the optical coupler 22 into an electrical signal, and the photodetector 34 converts the signal light split by the optical coupler 30 into an electrical signal. The electrical signal from the photodetector 32 is supplied to an AGC circuit 36 as the first control unit, and the electrical signals from the photodetectors 32 and 34 are supplied to an AGC circuit 38 as the second control unit.

The signal light amplified by the first optical amplifying unit 16 is attenuated by the variable optical attenuator 18 and then supplied to the second optical amplifying unit 20. The signal light supplied to the second optical amplifying unit 20 is supplied through an optical coupler 40 and a WDM coupler 42 in this order to an EDF 44. Pump light from a laser diode 46 is supplied through the WDM coupler 42 to the EDF 44, thereby obtaining a gain according to the power of the pump light. The signal light amplified in the EDF 44 is passed through an optical coupler 48 and then output from the output end 14.

A photodetector 50 is provided to monitor the input to the second optical amplifying unit 20, and a photodetector 52 is provided to monitor the output from the second optical amplifying unit 20. The photodetector 50 converts the signal light split by the optical coupler 40 into an electrical signal, and the photodetector 52 converts the signal light split by the optical coupler 48 into an electrical signal. The electrical signal from the photodetector 52 is supplied to the AGC circuit 36, and the electrical signals from the photodetectors 50 and 52 are supplied to the AGC circuit 38.

A control signal is supplied from the AGC circuit 36 to the laser diodes 28 and 45 as the pumping sources, thereby controlling the total gain in the optical amplifier as a whole ranging from the input end 12 to the output end 14 to a target value. On the other hand, the AGC circuit 38 controls the attenuation of the variable optical attenuator 18 so that the sum of the gain in the first optical amplifying unit 16 and the gain in the second optical amplifying unit 20 becomes constant.

Figure 4:
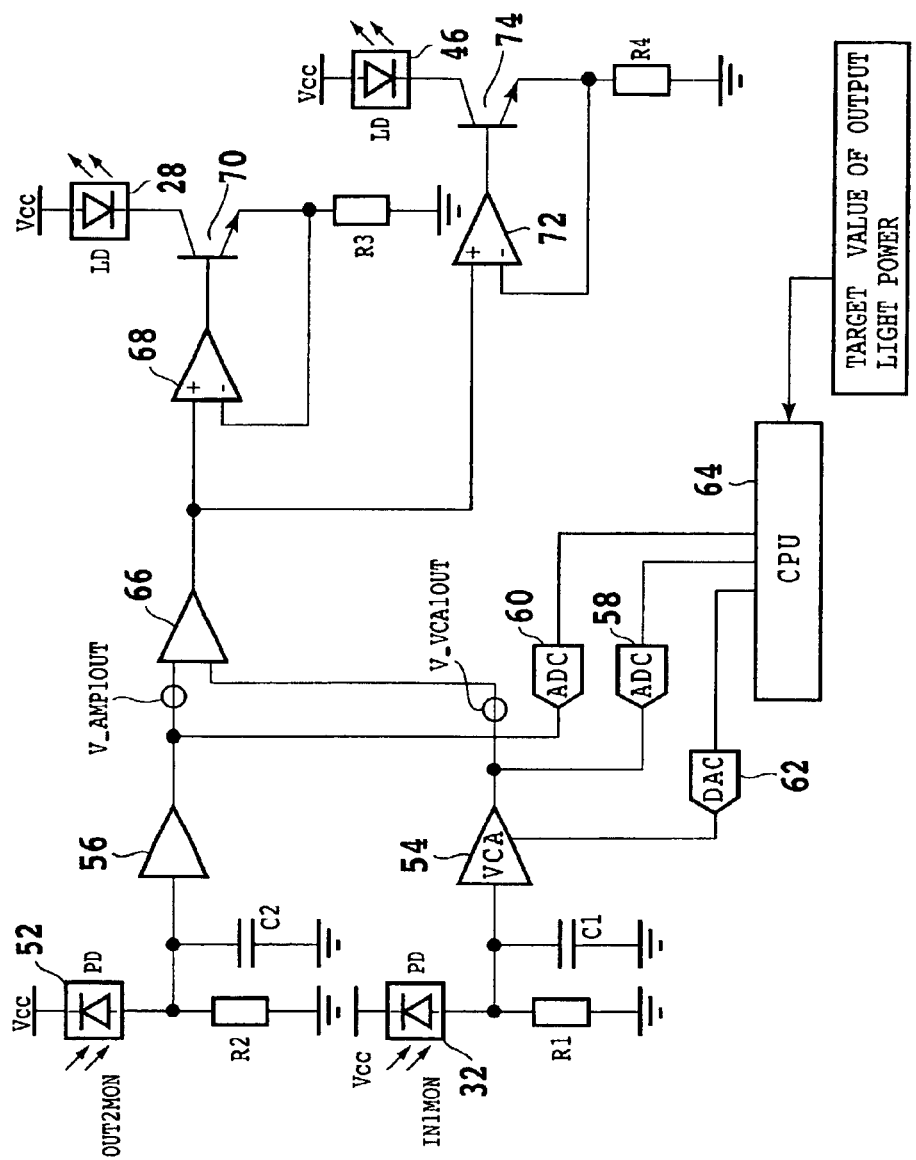
FIG. 4 is a block diagram showing a specific configuration of an AGC circuit 36 shown in FIG. 3.

Referring to FIG. 4, there is shown a specific configuration of the AGC circuit 36 for controlling the gains in the optical amplifying units 16 and 20 shown in FIG. 3. The photodetector 32 and a resistor R1 are connected in series between a power line Vcc and the ground to thereby apply a reverse bias to the photodetector 32, so that a photocurrent according to the input to the optical amplifying unit 16 flows through the photodetector 32 and the resistor R1, and a potential at a connection point between the photodetector 32 and the resistor R1 can be extracted as a voltage signal. A capacitor C1 is connected in parallel to the resistor R1 to cut off a signal component and obtain an average level of the input to the optical amplifying unit 16.

Similarly, the photodetector 52 and a resistor R2 are connected in series between the power line Vcc and the ground, and a capacitor C2 is connected in parallel to the resistor R2, so as to obtain a voltage signal according to the output from the optical amplifying unit 20 arranged on the rear stage.

The voltage signal by the photodetector 32 is amplified by a VCA (voltage-controlled amplifier) 54 whose gain is variable, and then supplied to one of the input ports of a differential amplifier 66. On the other hand, the voltage signal by the photodetector 52 is amplified by an amplifier 56 whose gain is fixed, and then supplied to the other input port of the differential amplifier 66.

The outputs from the VCA 54 and the amplifier 56 are converted into digital signals by analog/digital converters (ADC) 58 and 60, respectively, and the digital signals thus obtained are supplied to a CPU 64. Further, a digital signal obtained by computation in the CPU 64 is converted into a voltage signal by a digital/analog converter (DAC) 62, and the gain of the VCA 54 is adjusted according to the voltage signal.

An amplifier 68, a transistor 70, and a resistor R3 are provided to drive the laser diode 28 as the pumping source. Similarly, an amplifier 72, a transistor 74, and a resistor R4 are provided to drive the laser diode 46 as the pumping source. The laser diodes 28 and 46 are driven according to an output from the differential amplifier 66.

Letting V_Amp1OUT and V_VCAOUT respectively denote the output levels from the amplifier 56 and the VCA 54, the resistance values of the resistors R1 and R2 and the gains of the amplifier 56 and the VCA 54 are set so as to satisfy the following relation. When the input power, output power, and gain of the optical amplifier are x[dB], x+A[dB], and A[dB], respectively, V_Amp1OUT and V_VCAOUT coincide with each other to become y[V]. This means that the ratio in photodetection sensitivity [V/W] between monitor circuits respectively related to the photodetectors 32 and 52 is set to $10^{(AMP\_G/10)}$ where AMP_G is the gain of the optical amplifier.

Since A is constant, the output signal light power varies with variations in the input signal light power per wavelength channel. To cope with this, the CPU 64 performs computation so that the output signal light power is fixed to a target value, and adjusts the gain of the VCA 54 according to the result of this computation.

In this manner, ALC can be substantially performed by controlling the gains in the optical amplifying units 16 and 20 according to this preferred embodiment. Accordingly, as compared with the case where ALC is performed by using a variable optical attenuator in the prior art, the need for troublesome switching in changing the number of operating channels can be eliminated.

Figure 5:
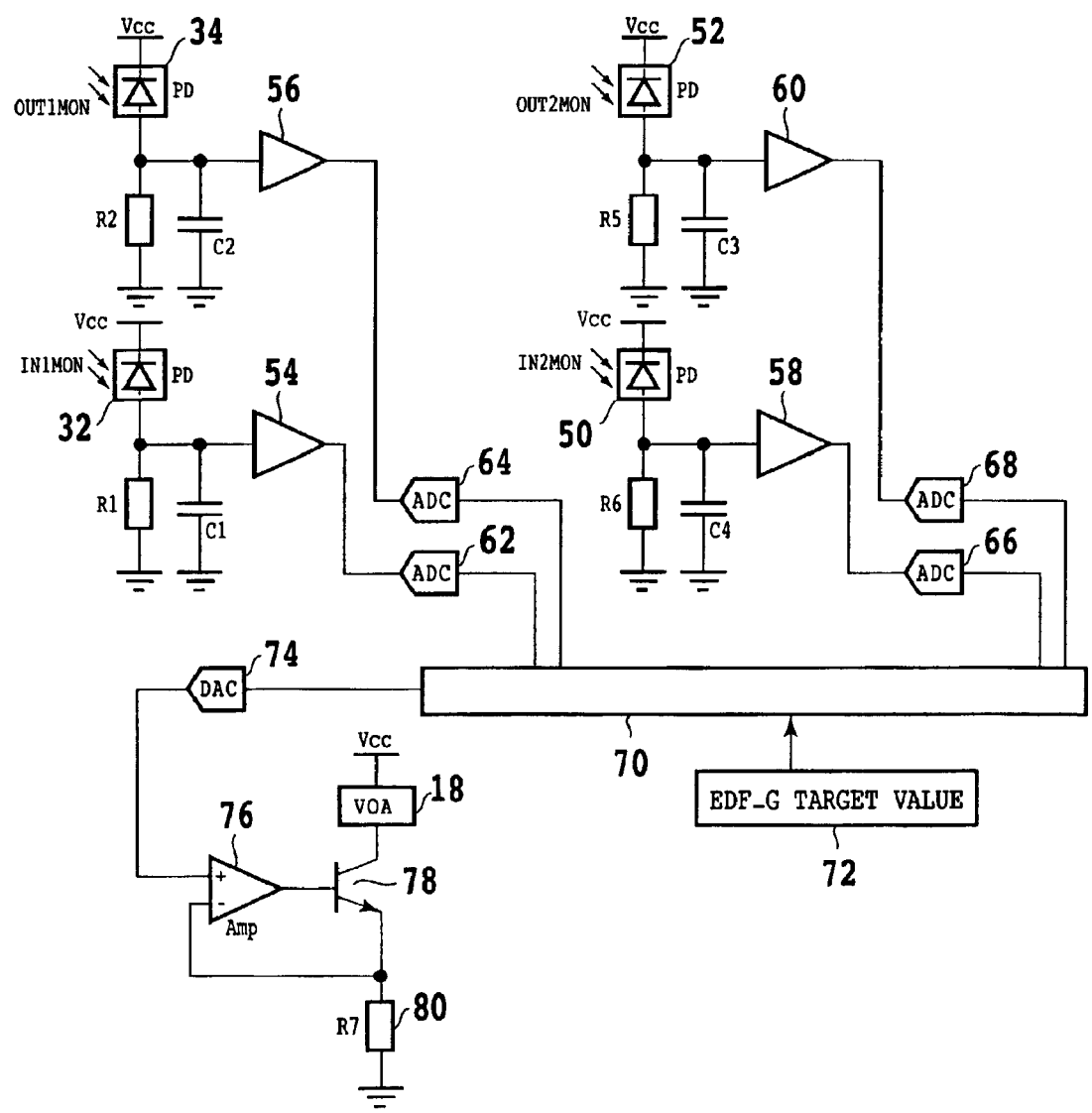
FIG. 5 is a block diagram showing a specific configuration of an AGC circuit 38 shown in FIG. 3.

Referring to FIG. 5, there is shown a specific configuration of the AGC circuit 38 shown in FIG. 3. The voltage signals by the photodetectors 32 and 34 are converted into digital signals by analog/digital converters 62 and 64, respectively, and the digital signals thus obtained are input into a CPU 70, so as to monitor the input to and the output from the first optical amplifying unit 16. Similarly, the voltage signals by the photodetectors 50 and 52 are converted into digital signals by analog/digital converters 66 and 68, respectively, and the digital signals thus obtained are input into the CPU 70, so as to monitor the input to and the output from the second optical amplifying unit 20.

The CPU 70 calculates a condition (specifically, the attenuation of the variable optical attenuator 18) for making constant the sum of the gain generated in the first optical amplifying unit 16 and the gain generated in the second optical amplifying unit 20. The result of this calculation is converted into a voltage signal by a digital/analog converter 74, and the voltage signal thus obtained is supplied to a drive circuit for the variable optical attenuator 18 including an amplifier 76, a transistor 78, and a resistor R7.

There will now be described more specifically the control of the variable optical attenuator 18 and a technical effect obtained by this control.

If the control by only the AGC circuit 36 shown in FIG. 4 is performed, the wavelength characteristic of gain in the wavelength band of WDM signal light cannot be kept constant, so that there is a possibility of degradation in transmission characteristics due to the generation of gain deviation (gain tilt). In the configuration that a plurality of optical amplifiers are cascaded, the wavelength characteristic of gain can be kept constant by controlling the gain of each optical amplifier to a constant value. As another way, the wavelength characteristic of gain can be kept constant by controlling the sum of the gains of the plural optical amplifiers to a constant value.

Letting G_A'[dB] and G_B'[dB] respectively denote the actual gains in the first and second optical amplifying units 16 and 20 and G_A[dB] and G_B[dB] respectively denote the target gains in the first and second optical amplifying units 16 and 20, the fundamental control is to satisfy the relations of G_A'=G_A and G_B'=G_B.

The control in the prior art is performed so that when the gain in the first optical amplifying unit 16 decreases by ΔG[dB], the gain in the second optical amplifying unit 20 increases by ΔG[dB]. As a result, the relation of G_A'+G_B'=G_A+G_B is substantially satisfied to thereby keep constant the wavelength characteristic of gain in the optical amplifier as a whole. However, AGC is necessary in each of the first and second optical amplifying units and a function of exchanging ΔG between the first and second optical amplifying units is also necessary, so that high-speed AGC is difficult to perform.

In this preferred embodiment, the variable optical attenuator 18 performs the control for making the sum of the gains in the first and second optical amplifying units constant, thereby solving the above problem.

The CPU 70 calculates the sum EDF_G' of the gains in the optical amplifying units 16 and 20 in accordance with the following expression.

$$EDF\_G'=G\_A'+G\_B'=(OUT1MON-IN1MON)+(OUT2MON-IN2MON)$$

where IN1MON, OUT1MON, IN2MON, and OUT2MON are the monitored values of optical powers by the photodetectors 32, 34, 50, and 52, respectively.

Then, the comparison between EDF_G' and EDF_G as a target value of EDF_G' is made and the attenuation of the variable optical attenuator 18 is controlled so that the difference between EDF_G' and EDF_G becomes zero in accordance with the following expression.

$$EDF\_G'=(OUT2MON-IN1MON)+(OUT1MON-IN2MON)= AMP\_G+VOA\_L$$

where AMP_G is the total gain in the optical amplifier, and VOA_L is the attenuation of the variable optical attenuator 18.

Accordingly, the attenuation of the variable optical attenuator 18 can be easily controlled so as to satisfy the relation of VOA_L=EDF_G−AMP_G.

In this manner, the wavelength characteristic of total gain in the optical amplifier is kept constant by controlling the variable optical attenuator 18 in this preferred embodiment. Accordingly, as compared with the case where AGC is performed in each of a plurality of optical amplifying units to keep the wavelength characteristic of gain in each unit constant as in the prior art, the control configuration of the optical amplifier in this preferred embodiment can be simplified to thereby support high-speed AGC.

According to the present invention as described above, it is possible to provide an optical amplifier applicable to WDM and a control method therefor which can suppress a control error in performing AGC and ALC, can eliminate a complicated configuration, and can easily respond to a change in number of wavelength channels.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical amplifier comprising:

first and second optical amplifying units;

a variable optical attenuator optically connected between the first and second optical amplifying units;

a first control unit for controlling the gains of the first and second optical amplifying units according to an input to the first optical amplifying unit and an output from the second optical amplifying unit; and a second control unit for controlling the attenuation of the variable optical attenuator according to an input to and an output from the first optical amplifying unit and an input to and an output from the second optical amplifying unit.

2. An optical amplifier according to claim 1, wherein:

the first control unit controls the gains of the first and second optical amplifying units so that the output power from the optical amplifier becomes constant; and the second control unit controls the attenuation of the variable optical attenuator so that the sum of the gains of the first and second optical amplifying units becomes constant.

3. An optical amplifier according to claim 1, wherein:

each of the first and second optical amplifying units includes an optical amplifying medium and a pumping source for supplying pump light to the optical amplifying medium; and the gain of each of the first and second optical amplifying units is controlled according to the power of the pump light output from the pumping source.

4. An optical amplifier according to claim 1, further comprising:

first and second photodetectors for respectively converting the input to and the output from the first optical amplifying unit into electrical signals, and third and fourth photodetectors for respectively converting the input to and the output from the second optical amplifying unit into electrical signals;

the electrical signals from the first and fourth photodetectors being supplied to the first control unit;

the electrical signals from the first to fourth photodetectors being supplied to the second control unit.

5. An optical amplifier according to claim 4, wherein the first control unit includes means for controlling the first and second optical amplifying units so that the level difference between the electrical signals from the first and fourth photodetectors becomes equal to a set value.

6. An optical amplifier according to claim 4, wherein the second control unit includes means for controlling the attenuation of the variable optical attenuator so that the sum of the level difference between the electrical signals from the first and second photodetectors and the level difference between the electrical signals from the third and fourth photodetectors becomes constant.

7. A control method for an optical amplifier comprising first and second optical amplifying units and a variable optical attenuator optically connected between the first and second optical amplifying units, the control method comprising the steps of:

(a) controlling the gains of the first and second optical amplifying units according to an input to the first optical amplifying unit and an output from the second optical amplifying unit; and (b) controlling the attenuation of the variable optical attenuator according to an input to and an output from the first optical amplifying unit and an input to and an output from the second optical amplifying unit.

8. A control method according to claim 7, wherein:

the step (a) includes the step of controlling the gains of the first and second optical amplifying units so that the output power from the optical amplifier becomes constant; and the step (b) includes the step of controlling the attenuation of the variable optical attenuator so that the sum of the gains of the first and second optical amplifying units becomes constant.

9. A control method according to claim 7, wherein:

each of the first and second optical amplifying units includes an optical amplifying medium and a pumping source for supplying pump light to the optical amplifying medium; and the gain of each of the first and second optical amplifying units is controlled according to the power of the pump light output from the pumping source.

10. A control method according to claim 7, further comprising the steps of converting the input to and the output from the first optical amplifying unit into first and second electrical signals, respectively, and converting the input to and the output from the second optical amplifying unit into third and fourth electrical signals, respectively;

the step (a) including the step of receiving the first and fourth electrical signals; and the step (b) including the step of receiving the first to fourth electrical signals.

11. A control method according to claim 10, wherein the step (a) further includes the step of controlling the first and second optical amplifying units so that the level difference between the first and fourth electrical signals becomes equal to a set value.

12. A control method according to claim 10, wherein the step (b) further includes the step of controlling the attenuation of the variable optical attenuator so that the sum of the level difference between the first and second electrical signals and the level difference between the third and fourth electrical signals becomes constant.

* * * * *

UNITED STATES PATENT AND TRADEMARK OFFICE
CERTIFICATE OF CORRECTION

| | |
|---|---|
| PATENT NO. | : 6,977,770 B2 |
| APPLICATION NO. | : 10/316080 |
| DATED | : December 20, 2005 |
| INVENTOR(S) | : Kosuke Komaki et al. |

It is certified that error appears in the above-identified patent and that said Letters Patent is hereby corrected as shown below:

On the cover page, (56) Reference Cited, U.S. Patent Documents, column 1, line 3, change "5,966,327" to --5,966,237--

Signed and Sealed this

Third Day of October, 2006

JON W. DUDAS
*Director of the United States Patent and Trademark Office*